(12) United States Patent
Ding et al.

(10) Patent No.: US 11,907,662 B2
(45) Date of Patent: Feb. 20, 2024

(54) SYSTEM AND METHOD FOR DOMAIN-INDEPENDENT TERMINOLOGY LINKING

(71) Applicant: Robert Bosch GmbH, Stuttgart (DE)

(72) Inventors: Haibo Ding, Salt Lake City, UT (US); Yifan He, Sunnyvale, CA (US); Lin Zhao, Sunnyvale, CA (US); Kui Xu, Sunnyvale, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 16/958,888

(22) PCT Filed: Dec. 27, 2018

(86) PCT No.: PCT/US2018/067617
§ 371 (c)(1),
(2) Date: Jun. 29, 2020

(87) PCT Pub. No.: WO2019/133671
PCT Pub. Date: Jul. 4, 2019

(65) Prior Publication Data
US 2020/0342178 A1     Oct. 29, 2020

Related U.S. Application Data

(60) Provisional application No. 62/611,575, filed on Dec. 29, 2017.

(51) Int. Cl.
*G06F 17/00*     (2019.01)
*G06F 40/30*     (2020.01)
(Continued)

(52) U.S. Cl.
CPC .............. *G06F 40/30* (2020.01); *G06F 16/36* (2019.01); *G06F 40/169* (2020.01);
(Continued)

(58) Field of Classification Search
CPC ........ G06F 40/30; G06F 16/36; G06F 40/169; G06F 40/247; G06N 5/022; G06N 5/04; G06N 7/005; G06N 7/01
See application file for complete search history.

(56) References Cited

U.S. PATENT DOCUMENTS

| 5,333,237 A | 7/1994 | Stefanopoulos et al. |
| 7,885,918 B2 | 2/2011 | Statchuk |
| (Continued) | | |

FOREIGN PATENT DOCUMENTS

| JP | 2017-123168 A | 7/2017 |
| WO | 2017/100356 A1 | 6/2017 |

OTHER PUBLICATIONS

Han, Xianpei, Le Sun, and Jun Zhao. "Collective entity linking in web text: a graph-based method." Proceedings of the 34th international ACM SIGIR conference on Research and development in Information Retrieval. 2011 (Year: 2011).*

(Continued)

*Primary Examiner* — Andrew T McIntosh
(74) *Attorney, Agent, or Firm* — Maginot, Moore & Beck LLP

(57) ABSTRACT

An automatic terminology linking system includes a candidate generator configured to identify candidate nodes for each terminology that is to be linked to a node of the knowledge base. A pseudo-candidate generator is configured to identify pseudo-candidate nodes for candidate-less terminologies. A candidate scorer is configured to respectively score the candidate nodes and the pseudo-candidate nodes by collective inference using occurrence statistics and co-occurrence statistics for these nodes. The pseudo-candidate generator is configured to identify knowledge base nodes (Continued)

that are semantically-related to candidate-less terminology as the pseudo-candidate nodes for the candidate-less terminology.

16 Claims, 2 Drawing Sheets

(51) Int. Cl.
| | | |
|---|---|---|
| G06F 16/36 | (2019.01) | |
| G06F 40/247 | (2020.01) | |
| G06F 40/169 | (2020.01) | |
| G06N 5/022 | (2023.01) | |
| G06N 5/04 | (2023.01) | |
| G06N 7/01 | (2023.01) | |

(52) U.S. Cl.
CPC ........... *G06F 40/247* (2020.01); *G06N 5/022* (2013.01); *G06N 5/04* (2013.01); *G06N 7/01* (2023.01)

(56) References Cited

U.S. PATENT DOCUMENTS 7,953,754 B2 * 5/2011 Cunnane ............... G06F 40/258 707/786
2011/0106821 A1 5/2011 Hassanzadeh et al.
2013/0007607 A1 * 1/2013 Caldwell ............... G06F 40/242 715/259
2015/0154509 A1 6/2015 Lightner et al.
2015/0332158 A1 * 11/2015 He ....................... G06F 16/9024 706/52
2016/0357738 A1 12/2016 Langmead et al.
2017/0024476 A1 1/2017 Gramatica
2018/0082183 A1 * 3/2018 Hertz ...................... G06N 5/00

OTHER PUBLICATIONS

Shen, Wei, Jianyong Wang, and Jiawei Han. "Entity linking with a knowledge base: Issues, techniques, and solutions." IEEE Transactions on Knowledge and Data Engineering 27.2 (2014): 443-460 (Year: 2014).*

International Search Report corresponding to PCT Application No. PCT/US2018/067617, dated Apr. 9, 2019 (3 pages).

Pershina, M. et al., "Holistic Entity Matching Across Knowledge Graphs," Proceedings of the 2015 IEEE Conference on Big Data, 2015, 1585-1590 (6 pages).

D'Souza, J. et al., "Sieve-Based Entity Linking for the Biomedical Domain," Proceedings of 53rd Annual Meeting of the Association for Computational Linguistics, Jul. 26-31, 2015, pp. 297-302 (6 pages).

* cited by examiner

SYSTEM AND METHOD FOR DOMAIN-INDEPENDENT TERMINOLOGY LINKING

CROSS-REFERENCE TO RELATED APPLICATIONS

This application is a 35 U.S.C. § 371 National Stage Application of PCT/US2018/067617, filed on Dec. 27, 2018, which claims priority to U.S. Provisional Application Ser. No. 62/611,575, filed on Dec. 29, 2017, the disclosures of which are incorporated herein by reference in their entirety.

TECHNICAL FIELD

This invention relates to the field of natural language processing (NLP), information extraction, terminology processing, and human machine interaction (HMI).

BACKGROUND

Knowledge bases (KBs) are among the most important pillars of modern intelligent systems. KBs are both provided as standalone products or services, and enable downstream applications such as question answering and semantic search: e.g. to answer questions about "direct injection" by automobile professionals, many systems rely on pre-constructed knowledge bases about automobile terminologies. An important first step in such systems is to link the natural language phrase "direct injection" to a node in KB. This is called Entity Linking (EL).

Most existing work on EL focuses on named entities, i.e. person, organization, and location names. But for domain specific knowledge-based applications in the industrial setting, for instance, systems that recommend power tools to DIY users, or systems that support car repairing activities, requires that domain-specific terminologies are linked to KB nodes as well. This invention disclosure presents an EL system with terminology linking capability to support various industrial use cases.

Accurately linking phrases to KB nodes is a difficult task. First, the phrase may not directly correspond to the name of a KB node. For example, the phrase "Hybrid" in documents about repairing cars should probably be linked to "Hybrid_vehicle", but the two surface forms are not identical. In addition, phrases can be ambiguous: the word "fatigue" can either mean "Fatigue_(medical)" in a medical document or mean "Fatigue_(metal)" in a material science document.

Occurrence and co-occurrence statistics are collected from a large corpus where phrases are manually linked to KB nodes (Wikipedia in practice) to solve these problems. Occurrence statistics to measure how likely a mention is linked to a node, i.e., if "Hybrid" is frequently linked to "Hybrid_vehicle" somewhere in the corpus, the system will be able to propose "Hybrid_vehicle" when it encounters "Hybrid" in unseen text. Co-occurrence statistics measures how likely two entities appear together in the same document, so that the system will be able to determine that "fatigue" probably means "Fatigue_(metal)", if there is another entity "Cast_iron" in the document based on the association between "fatigue" and "Cast_iron."

One challenge that makes terminology linking especially hard is that many terminologies in technical documents are emerging or highly-specific concepts that are not yet covered by KBs. As a result, co-occurrence statistics do not exist for these terminologies.

DETAILED DESCRIPTION

Figure 1:
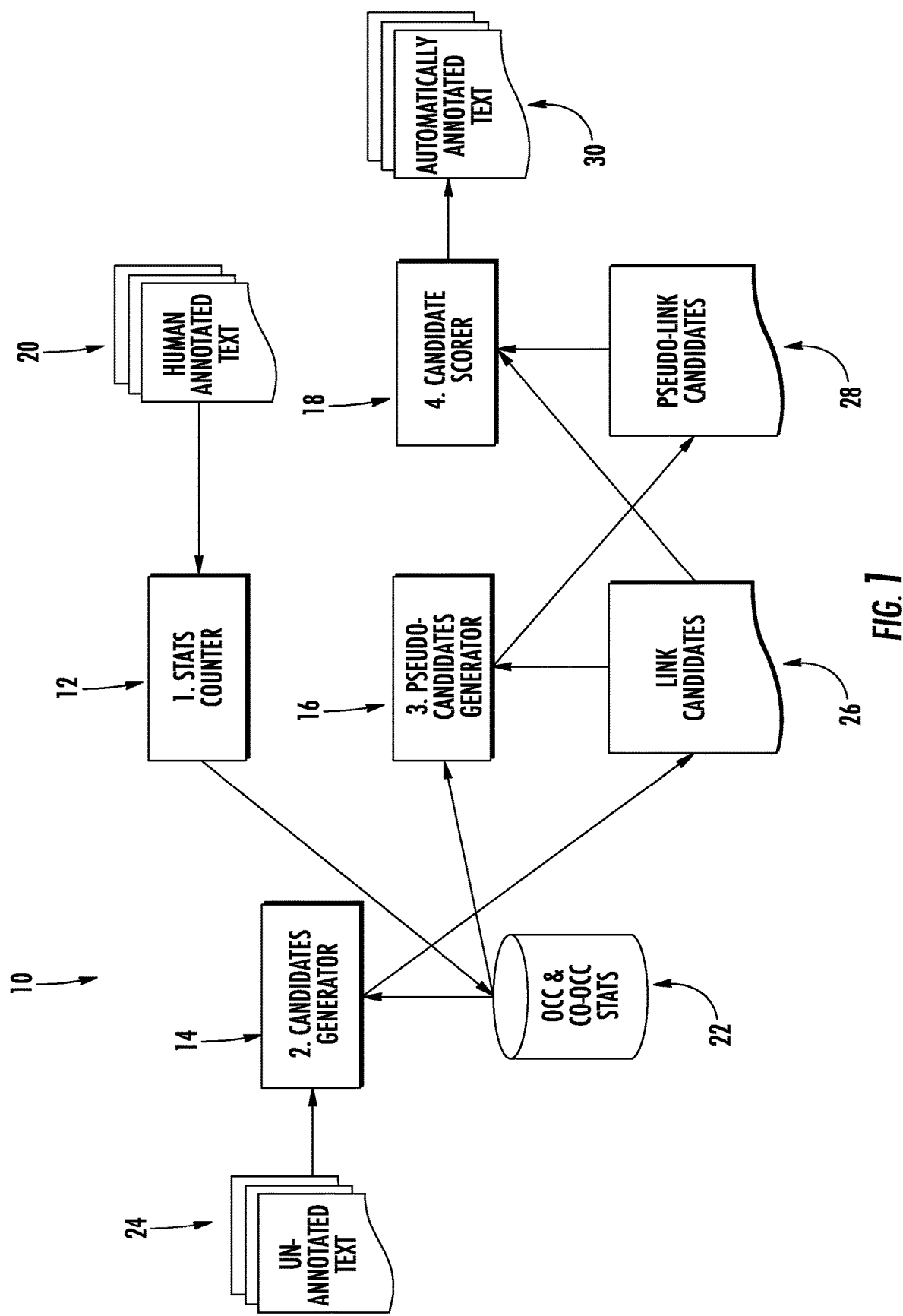
FIG. 1 is a workflow diagram of a domain-independent terminology linking system in accordance with this disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

This disclosure is directed to a computing system and methodology for linking terminologies in text media such as academic papers, technical reports, and user-generated contents, to knowledge base (KB) nodes, e.g. Wikipedia pages. In contrast, most systems in prior-art focus on named entities (person, organization, and location names) only.

As used herein, the term "knowledge base" refers to a human annotated text collection having nodes which are associated with entities, such as people, places or things, and terminologies, which refer to the lexicon used in association with a particular field, practice area, or technology. The nodes of the knowledge base may include links to related or referenced nodes. As used herein, the term "annotated" means that entities and terminologies in the text collection are already linked to nodes in the knowledge base. Wikipedia is an example of an annotated knowledge base from which occurrence and co-occurrence statistics may be gathered for the system.

As discussed below, the system first preprocesses a full text KB (i.e. a KB whose nodes have natural language descriptions), and generates occurrence and co-occurrence statistics of KB nodes based on the description text for the nodes. Candidate nodes are generated for new terminologies that are to be linked to the KB. The candidate nodes are identified based on the occurrence statistics. The candidate nodes in the same document are then scored through collective inference, using both occurrence and co-occurrence statistics among these nodes.

For terminologies that have no candidates associated therewith, our system automatically constructs a list of pseudo-candidate nodes which are semantically-related to the terminology. This is a major departure from prior-art. The pseudo-candidate nodes are near-synonyms for the terminology. The co-occurrence statistics of the near-synonyms are used to facilitate joint inference. The terminologies are then linked to the highest scored nodes or pseudo-nodes for the terminology. This system is useful for itself in digital library applications and can be used to facilitate KB construction and semantic search.

The combination of collective inference using occurrence and co-occurrence statistics and the pseudo-link generator, the proposed system achieves state-of-the-art performance on terminology linking. The system can be used to create digital library applications, such as car repair tutorials and technical document explorers, which offer inline links to KBs. It can also be used as pre-processor for other knowledge-based applications.

Referring to FIG. 1, the automatic terminology linking system 10 comprises four major components. These components are a KB statistics counter 12, a candidates generator 14, a pseudo-candidate generator 16 and a candidate scorer 18 which are operate in accordance with the workflow diagram of FIG. 1. The statistics counter 12 is an offline component. The candidate generator 14, the pseudo-candidate generator 16 and the candidate scorer 18 are online components that link terminologies to corresponding KB nodes on-the-fly.

The KB statistics counter 12 calculates two types of statistics, occurrence statistics and co-occurrence statistics based on a human annotated text collection 20. By being annotated, the entities and terminologies in the text collection 20 are already linked as appropriate. Wikipedia is an example of an annotated collection upon for the purposes of this system.

Occurrence statistics measure how likely a mention (m) is linked to a KB node (e). Formally, it is the estimation of the conditional probability p(e|m). Co-occurrence statistics measure how likely two KB entities or terminologies appear in the same document. Formally, it is the estimation of the joint probability $p(m_1, m_2)$. Both occurrence and co-occurrence statistics can be calculated using the raw count of occurrences of entities and terminology mentions in the annotated text collection. The KB statistics counter 12 may store occurrence statistics and co-occurrence statistics in an occurrence database 22.

Figure 2:
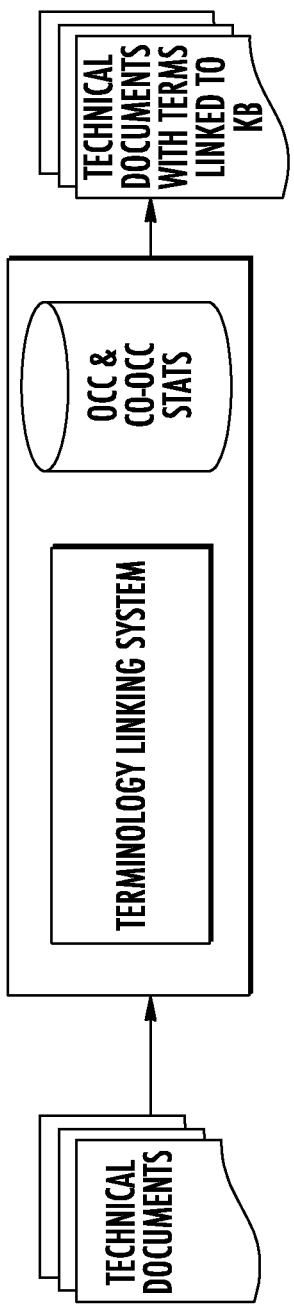
FIG. 2 shows a high level architecture of the system of FIG. 1

The candidate generator 14 accepts a document 24 and a list of terminologies in the document 24 as input (FIG. 2). The term "document" can include any type of document, including electronic files, books, articles, webpages, e-mails, files, and any other type of item upon which a textual search of its contents can be conducted.

In one embodiment, the list of terminologies from the document is generated beforehand by an external party or system. Alternatively, the list of terminologies may be generated as part of the functionality of the system. For example, the system may include a terminology identification component which is configured to receive a document or other form of text data and to parse the text data to create the list of terminologies in the document. Any suitable method or algorithm may be used to identify terminologies within the document.

The candidate generator 14 processes the list of terminologies with respect to the KB nodes in the knowledge base to produce a list of candidate nodes 26 for each terminology. Candidate nodes 26 are nodes in the KB to which terminologies in the document can potentially link. Each terminology in the document can only be correctly linked to one KB node, but can have more than one candidate in the candidate generation phase.

Given a terminology (m) and a probability distribution p(e|m) generated by the KB statistics counter 12, the candidate generator 14 returns the KB nodes whose corresponding p(e|m) are not zero. In other words, the candidate generator 14 returns all KB nodes that are linked at least once to the terminology (m) in the annotated text collection 20.

One of the major challenges facing terminology linking is that many terminologies are emerging or highly domain-specific concepts that have no corresponding node in the KB. As a result, the candidate generator 14 is not able to produce candidates for these terminologies and these terminologies have no statistics for the scorer to utilized. These terminologies are referred to herein as NIL terms because the candidate generator returns a NIL value when identifying candidate nodes for the terminology, as well as candidate-less terminologies for obvious reasons.

The proposed system incorporates a pseudo-candidates generator 16 to capture the information behind the NIL terms. The output of the pseudo-candidates generator 16 is a list of pseudo-candidate nodes 28. Pseudo-candidate nodes 28 are KB nodes that are not identical to the NIL term but are semantically related to the NIL term.

These pseudo-candidates can be generated in various ways, depending at least in part on the nature of the application. For example, the pseudo-candidate generator may be configured to identify knowledge base nodes that share words with the NIL terms as pseudo-candidate nodes for the NIL terms. As another example, the pseudo-candidate generator may be configured to identify knowledge base nodes that are distributionally similar to the NIL term as pseudo-candidates for the candidate-less terminology. Distributional similarity between the NIL terms and the nodes of the knowledge base may be determined using vector representations of the knowledge base nodes and the unlinked terminology according to a model, such as a Word2vec representation model.

Once the candidates 26, the pseudo-candidates 28 and their corresponding occurrence and co-occurrence statistics 22 have been identified, the candidate scorer 18 performs collective inference on the document to score the candidates and pseudo-candidates using a scoring algorithm, such as the Loopy Belief Propagation (LBP) algorithm. Other suitable algorithms may be used.

After being scored, each non-NIL terminology is linked to the KB node corresponding to the highest-scored candidate identified for that terminology. Similarly, NIL terms may be linked with the highest scored pseudo-candidate. Alternatively, further processing may be performed to determine whether pseudo-candidate scores are high enough to merit association with the terminology before NIL-terms are linked to pseudo-candidate nodes.

The system may include an output generating system for generating output based on the terminology links to the KB. For example, technical documents may be generated with terms linked to associated nodes in the KB (FIG. 2). Alternatively, data repositories, such as databases, spreadsheets, and even other knowledge bases, may be generated with the terminologies and associated KB links.

The components of the system may be implemented by one or more computing devices having one or more processors, such as a central processing unit (CPU), an application specific integrated circuit (ASIC), a field programmable gate array (FPGA) device, or a micro-controller. The processor is configured to execute programmed instructions that are stored in the memory. The memory can be any suitable type of memory, including solid state memory, magnetic memory, or optical memory, just to name a few, and can be implemented in a single device or distributed across multiple devices. The programmed instructions stored in memory include instructions for implementing various functionalities in the system, including identifying candidates and candidate nodes for terminologies and using collective inference based on occurrence and co-occurrence statistics to score the candidates. The computing device(s) may include network interface device(s) for accessing and communicating via a network.

The combination of collective inference using occurrence and co-occurrence statistics and the pseudo-link generator, the proposed system achieves state-of-the-art performance on terminology linking. The system can be used to create digital library applications, such as car repair tutorials and technical document explorers, which offer inline links to KBs. It can also be used as pre-processor for other knowledge-based applications.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An automatic terminology linking system for automatically linking terminology to nodes of a knowledge base, the system comprising:
a processor configured to:
identify candidate nodes for each terminology that is to be linked to a node of the knowledge base using occurrence statistics, wherein each terminology determined to have no candidates is identified as candidate-less terminology;
identify pseudo-candidate nodes for the candidate-less terminology that is to be linked to a node of the knowledge base, the pseudo-candidate nodes being semantically-related to candidate-less terminology;
respectively score the candidate nodes and the pseudo-candidate nodes by collective inference using occurrence statistics and co-occurrence statistics for nodes of the knowledge base corresponding to the candidates and pseudo-candidates,
link each terminology to the node of the knowledge base corresponding to the highest-scored candidate node for the terminology; and
link each candidate-less terminology to the node of the knowledge base corresponding to the highest-scored pseudo-candidate for the candidate-less terminology,
wherein the occurrence statistics indicate probability that a terminology is linked to a respective node of the knowledge base, and
wherein the co-occurrence statistics indicate (i) a probability that two terminologies appear in a same document or (ii) a probability that two nodes of the knowledge based are linked to by a same document.

2. The system of claim 1, the processor being further configured to:
determine the occurrence statistics and the co-occurrence statistics for the nodes of the knowledge base using a collection of documents.

3. The system of claim 1, the processor being further configured to:
receive a document and a list of terminologies in the document as input.

4. The system of claim 3, the processor being further configured to:
generate technical documents with terminologies linked to associated nodes of the knowledge base.

5. The system of claim 1, the processor being further configured to:
identify knowledge base nodes that are near-synonyms to the candidate-less terminology as pseudo-candidates for the candidate-less terminology.

6. The system of claim 1, the processor being further configured to:
identify knowledge base nodes that share words with the candidate-less terminology as pseudo-candidates for the candidate-less terminology.

7. The system of claim 1, the processor being further configured to:
identify knowledge base nodes that are distributionally similar to the candidate-less terminology as pseudo-candidates for the candidate-less terminology.

8. The system of claim 1, the processor being further configured to:
determine a distributional similarity between the candidate-less terminology and the nodes of the knowledge base using vector representations of the knowledge base nodes and the unlinked terminology.

9. A method for automatically linking terminology to nodes of a knowledge base, the method comprising:
identifying candidate nodes for each terminology that is to be linked to a node of the knowledge base using occurrence statistics, wherein each terminology determined to have no candidates is identified as candidate-less terminology;
identifying pseudo-candidate nodes for the candidate-less terminology that is to be linked to a node of the knowledge base, the pseudo-candidate nodes being semantically-related to candidate-less terminology;
scoring the candidate nodes and the pseudo-candidate nodes by collective inference using occurrence statistics and co-occurrence statistics for nodes of the knowledge base;
linking each terminology to the highest-scored candidate for that terminology; and
linking each candidate-less terminology with the highest-scored pseudo-candidate for that candidate-less terminology,
wherein the occurrence statistics indicate probability that a terminology is linked to a respective node of the knowledge base, and
wherein the co-occurrence statistics indicate (i) a probability that two terminologies appear in a same document or (ii) a probability that two nodes of the knowledge based are linked to by a same document.

10. The method of claim 9, further comprising:
determining the occurrence statistics and the co-occurrent statistics for the nodes of the knowledge base using a collection of documents.

11. The method of claim 9, further comprising:
receiving a document and a list of terminologies in the document as input to identifying the candidate nodes.

12. The method of claim 11, further comprising:
generating a technical document with terminologies linked to associated nodes of the knowledge base.

13. The method of claim 9, the identifying pseudo-candidate nodes further comprising:
identifying knowledge base nodes that are near-synonyms to the candidate-less terminology as pseudo-candidates for the candidate-less terminology.

14. The method of claim 9, the identifying pseudo-candidate nodes further comprising:
identifying knowledge base nodes that share words with the candidate-less terminology as pseudo-candidates for the candidate-less terminology.

15. The method of claim 9, the identifying pseudo-candidate nodes further comprising:
identifying knowledge base nodes that are distributionally similar to the candidate-less terminology as pseudo-candidates for the candidate-less terminology.

16. The method of claim 9, further comprising:
  determining a distributional similarity between the candidate-less terminology and the nodes of the knowledge base using vector representations of the knowledge base nodes and the unlinked terminology.

\* \* \* \* \*